United States Patent Office 3,173,917
Patented Mar. 16, 1965

3,173,917
METHOD OF PREPARING SUBSTITUTED PHENYLPIPERAZINES
Lee N. Starker, Pearl River, N.Y., Janet K. Paul, Rivervale, N.J., and Leon Goldman, Nanuet, N.Y., assignors to American Cyanamid Company, New York, N.Y., a corporation of Maine
No Drawing. Filed Nov. 25, 1960, Ser. No. 71,422
7 Claims. (Cl. 260—268)

This invention relates to 1-arylpiperazines. More particularly, it relates primarily to a new method of preparation of 1-arylpiperazines.

The 1-arylpiperazines are useful as intermediates in the preparation of anthelmintically active piperazine compounds. For example United States Patent 2,807,617 describes the use of 1-arylpiperazines, such as 1-phenylpiperazine, in the preparation of 1-phenyl-4-haloacyl-piperazines which have been found highly active in the treatment of hookworm infections. These compounds of the present invention are also useful in preparing other pharmaceutical compounds wherein a portion of the molecule consists of a 1-arylpiperazine.

The synthesis of 1-arylpiperazines in the past has involved the use of cumbersome procedures which usually result in poor yields. For example, a former process describes the use of aniline which is condensed with a bis($\beta$-hydroxyethyl)amine or a bis($\beta$-haloethyl)amine in the presence of a mineral acid. The use of extended heating periods makes it difficult, if not impossible, to obtain 1-arylpiperazines bearing acid labile groups by this method.

The 1-arylpiperazines have also been prepared in the past by reacting an activated aryl halide with a piperazine such as, for example, p-nitrobromobenzene and 1-substituted piperazine in the presence of alkali to produce a 1-substituted-4-p-nitrophenylpiperazine. This process is limited to arylation with an activated aryl halide and therefore its usefulness is restricted.

We have now found that 1-arylpiperazines can be prepared in good yields with or without a substituent in the 4-position of the piperazine nucleus using piperazine or readily available 1-substituted piperazines as starting material. The compounds prepared by the process of the present invention may be represented by the following general formula:

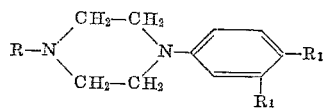

wherein R is selected from the group consisting of hydrogen, lower alkyl, aralkyl and aryl radicals and $R_1$ is selected from the group consisting of hydrogen and lower alkoxy at least one being hydrogen.

The compounds prepared by the process of the present invention are, in some instances, liquids and in others, crystalline solids which are soluble in the usual organic solvents and relatively insoluble in water.

The compounds of the present invention are prepared by reacting substantially two molecular equivalents of an aryllithium compound with an excess of piperazine or 1-substituted piperazine and about 1 molecular equivalent of the haloaryl compound such as halobenzene, which will subsequently arylate the piperazine. This reaction can be illustrated by the following equation:

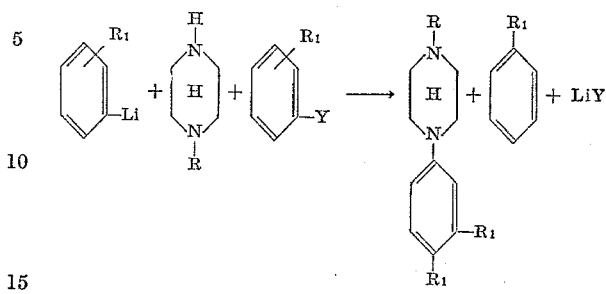

wherein R and $R_1$ are as hereinbefore defined and Y is a halogen such as bromine or chlorine. In the present process when unsubstituted piperazine is arylated, it is possible to obtain diarylation of the piperazine; also, when piperazine is not in excess a greater degree of diarylation occurs and obviously if mono arylation is desired the piperazine is used in excess of the molecular requirements.

The reaction is usually carried out at a temperature within the range of from about 10° C. to 120° C. for a period of from one hour to 24 hours. On completion of the reaction, the mixture is hydrolyzed by the addition of water and a mineral acid. The aqueous portion is extracted with ether and then made alkaline. Extraction of the alkaline solution with a solvent such as chloroform or ether followed by concentration of the extracts yields the crude product which can then be further purified by distillation or recrystallization.

As indicated above, the compounds prepared by the present process are useful as intermediates in preparing anthelmintic substituted 1-arylpiperazines such as 1-phenyl-4-dichloroacetylpiperazine. The process of the present invention, therefore, is capable of producing useful intermediates in a simple manner in good yields, which process was not heretofore available.

The process of the present invention may be illustrated by the following examples which describe in detail the preparation of 1-arylpiperazines.

EXAMPLE I

Preparation of 1-phenylpiperazine

An ether solution (420 ml.) of 0.42 mole of phenyllithium is added under a nitrogen atmosphere during a four hour period to a solution of 32.8 g. of bromobenzene and 143 g. of anhydrous piperazine in 1200 ml. of dry tetrahydrofuran. The reaction temperature is kept at 15° C. during the addition period. A precipitate begins to form almost immediately and the color slowly changes from light yellow to brown. The mixture is kept at room temperature overnight, after which time 250 ml. of water followed by 320 ml. of concentrated hydrochloric acid is added with cooling. A red emulsion forms and is broken after the addition of 200 ml. of water. The aqueous layer is separated, extracted well with ether and then made strongly basic with 275 ml. of 10 N sodium hydroxide. The basic solution is then extracted with six 250-ml. portions of ether. After drying over Linde Molecular Sieves, Type 4A, sodium aluminosilicate of unit cell formula $$Na_{12}[(AlO_2)_{12}(SiO_2)_{12}]\cdot 27H_2O$$

a 150-ml. portion of the 1.5 liters of solution is reacted with 5.0 ml. of phenyl isothiocyanate to yield 4.80 g. of crystals of 4-phenyl-1-piperazinethiocarboxanilide. Recrystallization from ethanol gives colorless crystals, melting point 158–159° C.

The remainder of the ethereal solution is then concentrated under reduced pressure to 19.3 g. of a yellow liquid, distillation of which yields 17.7 g. of 1-phenylpiperazine as a colorless liquid, boiling point 84–103° C. (0.2–0.6 mm.), $n_D^{20}$ 1.5890–1.5895.

EXAMPLE II

*Preparation of 1-phenyl-4-benzylpiperazine*

A solution (152 ml.) of 0.13 mole of phenyllithium in ether is added under a nitrogen atmosphere during a four hour period to a refluxing solution of 9.42 g. of bromobenzene and 42.3 g. of 1-benzylpiperazine in 150 ml. of anhydrous ether. A solid forms almost immediately. After stirring and refluxing for 19 hours, the mixture is cooled, decomposed with 50 ml. of water and acidified with concentrated hydrochloric acid. The aqueous layer is separated and combined with three 50-ml. hydrochloric acid (3 N) washes of the ether layer. The acidic, aqueous portion is then made strongly basic with 10 N sodium hydroxide at 20° C., and extracted with six 50-ml. portions of ether. The combined ethereal extracts are dried over sodium sulfate and concentrated under reduced pressure to 41.0 g. of an oil. Distillation of the concentration residue yields 9.65 g. of 1-phenyl-4-benzylpiperazine as a yellow oil, boiling point 154–158° C. (0.15 mm.).

An ether solution of the yellow oil, after treatment with gaseous hydrogen chloride, yields 1-phenyl-4-benzylpiperazine dihydrochloride as colorless crystals, melting point 214–216° C. after recrystallization from ethanol.

EXAMPLE III

*Preparation of 1,4-diphenylpiperazine*

An ether solution (60 ml.) of 0.039 mole of phenyllithium is added under a nitrogen atmosphere during a ¾ hour period to a refluxing solution of 13.0 g. of 1-phenylpiperazine and 3.14 g. of bromobenzene in 60 ml. of anhydrous ether. The reaction solution turns pink and solid formation begins almost immediately. The mixture is refluxed for three more hours and then is allowed to stand overnight at room temperature under a nitrogen atmosphere. The reaction mixture is hydrolyzed by the addition, with cooling, of 20 ml. of water followed by 40 ml. of 3 N hydrochloric acid. The acidic layer is separated and combined with three 50-ml. hydrochloric acid (3 N) washes of the ether layer. The acidic, aqueous portion is then made strongly basic with 10 N sodium hydroxide. Extraction of the basic solution with five 100-ml. portions of chloroform, drying of the combined extracts over magnesium sulfate, filtration and concentration of the filtrate under reduced pressure, yields 10.3 g. of a yellow oil. The addition of 40 ml. of ether to the oil causes the precipitation of a solid which, when filtered, yields 1.50 g. of 1,4-diphenylpiperazine, melting point 157–160° C. One recrystallization from methanol raises the melting point to 163–165° C.

EXAMPLE IV

*Preparation of 1-phenyl-4-methylpiperazine*

An ether solution (90 ml.) of 0.11 mole of phenyllithium is added under a nitrogen atmosphere during a 1¾ hour period to a refluxing solution of 20.0 g. of 1-methylpiperazine and 7.85 g. of bromobenzene in 150 ml. of anhydrous ether. The solution turns a pale brown color and a solid begins to separate immediately. Refluxing is continued for another 4½ hours and then the mixture is allowed to stand overnight at room temperature under a nitrogen atmosphere. The mixture is hydrolyzed by the addition, with cooling of 50 ml. of water followed by 140 ml. of 3 N hydrochloric acid. The acidic layer is separated and combined with three 50-ml. hydrochloric acid (3 N) washes of the ether layer. The acidic aqueous portion is then made strongly basic with 10 N sodium hydroxide, and extracted with five 100-ml. portions of chloroform. After drying over magnesium sulfate, the combined chloroform extracts are concentrated under reduced pressure to 19.3 g. of a brown oil. Distillation of the oil yields 5.57 g. of 1-phenyl-4-methylpiperazine as a colorless liquid, boiling point 99–100° C. (1 mm.).

EXAMPLE V

*Preparation of 1-(m-methoxyphenyl)-4-phenylpiperazine*

A mixture of 28.0 g. of o-bromoanisole and 2.29 g. of finely cut lithium ribbon in 150 ml. of anhydrous ether is refluxed for 4½ hours under a nitrogen atmosphere. The mixture turns brown and a solid beings to separate after ½ hour. After cooling to room temperature the reaction mixture is quickly filtered under a nitrogen atmosphere to yield 120 ml. of a 1.02 N solution of o-methoxyphenyllithium. The ether solution (108 ml.) of 0.11 mole of o-methoxyphenyllithium is added under a nitrogen atmosphere during a 2½ hour period to a refluxing solution of 32.4 g. of 1-phenylpiperazine and 9.35 g. of o-bromoanisole in 150 ml. of anhydrous ether. The reaction solution turns red after 5 minutes and solid formation begins after 20 minutes. The mixture is refluxed for another hour and is then allowed to stand overnight at room temperature under a nitrogen atmosphere. The mixture is hydrolyzed by the addition, with cooling, of 50 ml. of water followed by 100 ml. of 3 N hydrochloric acid. The acidic layer is separated and combined with three 50-ml. hydrochloric acid (3 N) washes of the ether layer. The acidic, aqueous portion is then made strongly basic with 10 N sodium hydroxide, and extracted with five 100-ml. portions of chloroform. After drying over magnesium sulfate, the combined chloroform extracts are concentrated under reduced pressure to 33.8 g. of a brown oil. The addition of 25 ml. of ether to the brown oil causes the precipitation of a solid which, when filtered, yields 7.39 g. of pale brown crystals of 1-(m-methoxyphenyl)-4-phenylpiperazine, melting point 113–114.5° C. Recrystallization from ethanol raises the melting point to 119.5–121° C. and recrystallization from benzene raises the melting point to 120.5–122° C.

EXAMPLE VI

*Preparation of 1-(m-methoxyphenyl)-4-benzylpiperazine dihydrochloride*

An ether solution (175 ml.) of 0.134 mole of o-methoxyphenyllithium (prepared in the same manner as in Example V) is added under a nitrogen atmosphere during a 35 minute period to a solution of 60.0 g. of 1-benzylpiperazine and 15.9 g. of o-bromoanisole in 200 ml. of anhydrous ether. The reaction temperature is kept between 19° C. and 26° C. during the addition. An orange color develops, along with turbidity, immediately. The mixture is allowed to stand overnight at room temperature under a nitrogen atmosphere and is then refluxed for four hours. After cooling, 50 ml. of water is added followed by 65 ml. of concentrated hydrochloric acid. The acidic layer is made strongly basic with 10 N sodium hydroxide and extracted with seven 100 ml. portions of ether. After drying over Linde Molecular Sieves, Type 4A, the combined ether extracts are concentrated under reduced pressure to 44.6 g. of a brown oil. An additional 18.1 g. of brown oil is obtained by salting out the basic solution with sodium chloride and repeating the ether extraction process. The 62.7 g. of brown oil is taken into 200 ml. of ether and extracted with four 100 ml. portions of water. The ether layer, after drying over magnesium sulfate, is concentrated under reduced pressure to 10.5 g. of a yellow liquid, which thickens to a very viscous oil on cooling. The oil is redissolved in 500 ml. of ether and gaseous hydrogen chloride is passed through the solution at 5–10° C. until no more solid separates. Filtration gives 13.6 g. of 1-(m-methoxyphenyl)-4-benzyl-piperazine dihydrochloride as a pale tan amorphous solid, melting point 193.5–195.5° C. This solid is purified by conversion to the free base and reconversion to the dihydrochloride. Recrystallization from ethanol yields colorless crystals of 1-(m-methoxyphenyl)-4-benzylpiperazine dihydrochloride quadrihydrate, melting point 208–210.5° C.

EXAMPLE VII

*Preparation of 1-(m-methoxyphenyl)-4-phenylpiperazine and 1-(p-methoxyphenyl)-4-phenylpiperazine*

Following the procedure of Example V and substituting p-bromoanisole for o-bromoanisole a mixture of 1-(m-methoxyphenyl) - 4 - phenylpiperazine and 1 - (p-methoxyphenyl)-4-phenylpiperazine is obtained.

We claim:

1. A method of preparing compounds of the formula:

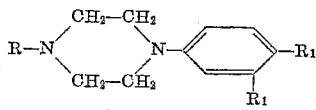

in which R is selected from the group consisting of hydrogen, lower alkyl, benzyl and phenyl and $R_1$ is selected from the group consisting of hydrogen and lower alkoxy at least one being hydrogen which comprises reacting at a temperautre within the range of from about 10° C. to 120° C. for a period of from about one hour to 24 hours at least two molecular equivalents of a compound having the formula:

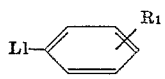

wherein $R_1$ is as defined above, with an excess of a piperazine having the formula:

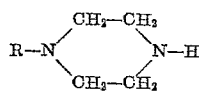

wherein R is as defined above and a molecular equivalent of a compound having the formula:

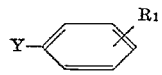

wherein $R_1$ is as defined above and Y is a halogen selected from the group consisting of bromine and chlorine in the presence of an organic solvent inert to the reactants.

2. A method of preparing 1-phenylpiperazine which comprises reacting at a temperature within the range of from about 10° C. to 120° C. for a period of from about one hour to 24 hours phenyllithium with anhydrous piperazine and bromobenzene in the presence of an organic solvent inert to the reactants and recovering said compound therefrom.

3. A method of preparing 1-phenyl-4-benzylpiperazine which comprises reacting at a temperature within the range of from about 10° C. to 120° C. for a period of from about one hour to 24 hours phenyllithium with 1-benzylpiperazine and bromobenzene in an organic solvent inert to the reactants and recovering said compound therefrom.

4. A method of preparing 1,4 - diphenylpiperazine which comprises reacting at a temperature within the range of from about 10° C. to 120° C. for a period of from about one hour to 24 hours phenyllithium with 1-phenylpiperazine and bromobenzene in the presence of an organic solvent inert to the reactants and recovering said compound therefrom.

5. A method of preparing 1-phenyl-4-methylpiperazine which comprises reacting at a temperature within the range of from about 10° C. to 120° C. for a period of from about one hour to 24 hours phenyllithium with 1-methylpiperazine and bromobenzene in the presence of an organic solvent inert to the reactants and recovering said compound therefrom.

6. A method of preparing 1-(m - methoxyphenyl)-4-phenylpiperazine which comprises reacting at a temperature within the range of from about 10° C. to 120° C. for a period of from about one hour to 24 hours o-bromoanisole with metallic lithium and subsequently with 1-phenylpiperazine and o-bromoanisole in the presence of an organic solvent inert to the reactants and recovering said compound therefrom.

7. A method of preparing 1-(m-methoxyphenyl)-4-benzylpiperazine dihydrochloride which comprises reacting at a temperature within the range of from about 10° C. to 120° C. for a period of from about one hour to 24 hours o-methoxyphenyllithium with 1-benzylpiperazine and o-bromoanisole in an organic solvent inert to the reactants and recovering said compound therefrom.

References Cited in the file of this patent
FOREIGN PATENTS
852,974     Great Britain _____ Nov. 2, 1960

OTHER REFERENCES
Ross et al.: Journal Chemical Society (London), pp. 2831–2834 (1949).

Adams et al.: Organic Reactions, vol. VIII, pp. 258–304; John Wiley and Sons, Inc., New York (1954).

Lowy et al.: An Introduction to Organic Chemistry, 6th edition, 1945, page 213, chapter XVIII.

Conant: The Chemistry of Organic Compounds, 1939, revised edition, pages 264–5, The Macmillan Co., N.Y.